United States Patent
Mehrl et al.

(10) Patent No.: US 8,253,868 B2
(45) Date of Patent: Aug. 28, 2012

(54) APPARATUS AND METHOD FOR USING VOICE COILS AS SCREEN MOTION SENSORS

(75) Inventors: David Joseph Mehrl, Plano, TX (US); Stephen Wesley Marshall, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1216 days.

(21) Appl. No.: 11/947,590

(22) Filed: Nov. 29, 2007

(65) Prior Publication Data

US 2009/0141347 A1 Jun. 4, 2009

(51) Int. Cl.
*H04N 9/12* (2006.01)
(52) U.S. Cl. ......... 348/739; 359/446; 359/697; 359/707
(58) Field of Classification Search .................. 250/234
See application file for complete search history.

(56) References Cited

U.S. PATENT DOCUMENTS

| | | | | |
|---|---|---|---|---|
| 3,614,570 | A * | 10/1971 | Mayle | 318/486 |
| 6,304,377 | B1 * | 10/2001 | Murr | 359/443 |
| 2007/0139109 | A1 * | 6/2007 | Honda et al. | 330/251 |
| 2007/0171521 | A1 * | 7/2007 | Sugawara et al. | 359/443 |
| 2008/0018808 | A1 * | 1/2008 | Seki | 348/751 |
| 2008/0117505 | A1 * | 5/2008 | Sandburg | 359/446 |
| 2008/0130134 | A1 * | 6/2008 | Ishida et al. | 359/698 |
| 2009/0009871 | A1 * | 1/2009 | Dunphy et al. | 359/599 |
| 2010/0220299 | A1 * | 9/2010 | Mizushima et al. | 353/38 |

* cited by examiner

*Primary Examiner* — Dominic D Saltarelli
*Assistant Examiner* — Jason J Chung
(74) *Attorney, Agent, or Firm* — Warren L. Franz; Wade J. Brady, III; Frederick J. Telecky, Jr.

(57) ABSTRACT

In one embodiment, a display device includes a movably suspended diffuser screen, and a voice-coil mechanism coupled to the diffuser screen. A signal-processing device, such as a microprocessor, is coupled to a driver circuit to produce a drive signal at an output terminal for the voice coil in response to a voltage sensed across the voice coil. The driver circuit includes shutdown control to drive its output terminal to a high-impedance state to accommodate sensing voltage across the voice coil. Thus, the signal for the voice coil is produced by the signal-processing device in a closed-loop feedback arrangement without the need for separate position-sensing elements. In a preferred arrangement, a second voice coil is coupled to the diffuser screen and to the signal-processing circuitry to produce a second signal for the second voice coil to accommodate generating a circular motion for the diffuser screen without stationary points.

17 Claims, 6 Drawing Sheets

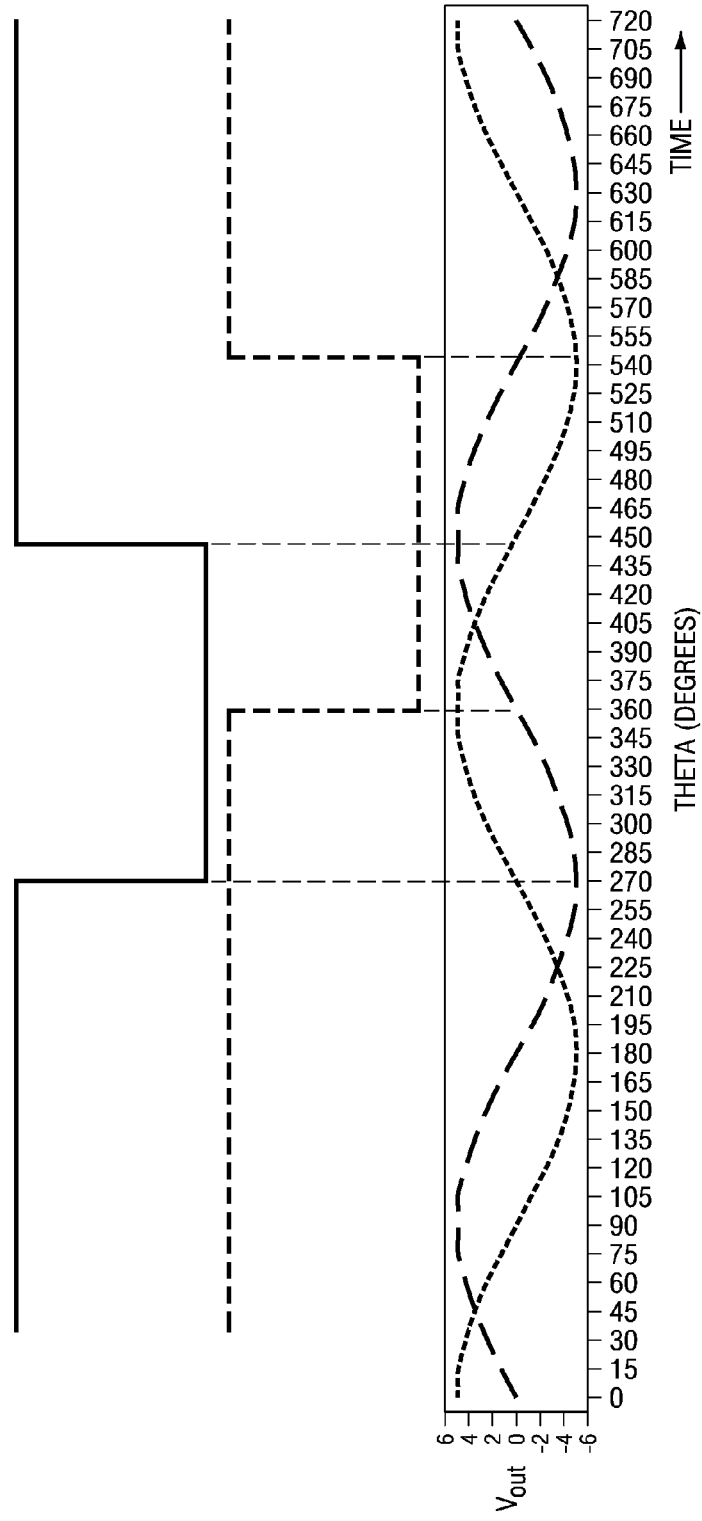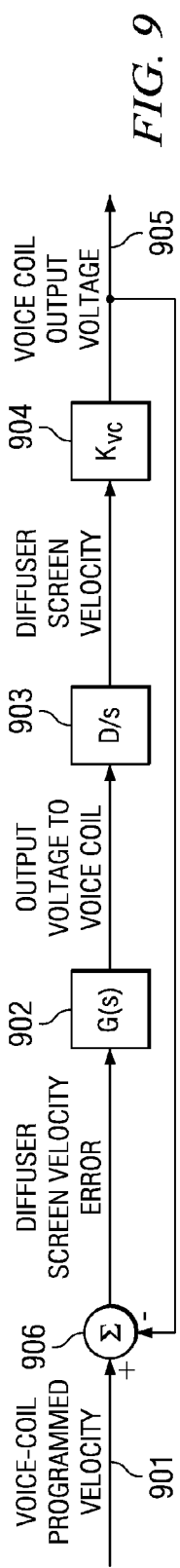

APPARATUS AND METHOD FOR USING VOICE COILS AS SCREEN MOTION SENSORS

TECHNICAL FIELD

This invention relates generally to an apparatus and method for employing a conductive coil in a magnetic field to impart a force to a mechanical object as well as to sense a motion of the object.

BACKGROUND

To construct a visible image on the screen of a monitor, television receiver, or other image-displaying device, one or more lasers can be employed to scan a controlled beam of light across a diffuser screen on which the visible image is formed. However, lasers, which generate a coherent light beam, create a "speckling" effect in the visible image, which detracts from image quality. Non-laser sources can also produce objectionable speckle, e.g., when a projector with a small lens projects an image onto a large screen with a small throw distance (e.g., as is often required in a rear-projection television receiver with a shallow cabinet depth). In that case, the projection lens appears as a quasi-point-source (like a laser) and can produce noticeable speckle.

Continuously moving the diffuser screen is a known despeckling technique. To produce a uniform level of despeckling across the screen, it is important to maintain a relatively constant level of motion for the entire surface of the screen so that the velocity of any point on the visible screen surface never falls below a critical value. For example, a straight-line oscillatory motion of the screen can produce points of zero velocity twice each oscillatory cycle. A preferred screen motion is a two-dimensional orbital motion or a "figure eight"/Lissajous-type motion, neither of which produces moments during which the velocity of the screen is zero. However, external noise and vibration, environmental effects (e.g., effects due to temperature, gravity, etc.), nonlinear springs, multiple frequencies/resonant modes, etc., can lead to unpredictable motion, generating a need to sense screen motion for feedback control. Prior art techniques to sense screen motion include optical screen motion sensors, among other motion-sensing devices.

Turning now to FIG. 1, illustrated is a simplified drawing of a four-quadrant optical position sensor 101 of the prior art. The optical position sensor is formed with four photodiodes arranged in quadrants 105, 106, 107, and 108. When the photodiodes are illuminated by a light beam, such as light beam 102 produced by a light-emitting diode (not shown), each quadrant generates a current proportional to the net light flux of the beam falling thereon, which can be sensed and compared using ordinary operational amplifiers to measure sensor position. Typically, the beam is formed with a bell-shaped intensity distribution, with the highest light intensity at the center of the beam. In this manner, misalignment of the beam with respect to alignment of the photodiodes can be detected using conventional circuits such as operational amplifiers configured as difference amplifiers coupled to the photodiodes to sense photodiode current. Velocity of the screen can be determined by differentiating with respect to time the position of the screen produced by the photodiode sensing arrangement. Such optical-sensing approaches, however, generally lead to alignment problems as parts bow and distort over time due to changes in temperature, or changes in direction of gravitational forces due to cabinet reorientation. Misalignment of sensors can also result in mechanical abrasion due to unintended screen motion, leading to wear, failure, and noise. The use of photodiodes to sense screen motion also adds significant cost to an end product due to the need to provide, mount, and align additional mechanical components.

A further example of motion sensing is the use of accelerometers. A disadvantage, however, of using accelerometers is their relatively high cost. Accelerometers also have a disadvantage in that inferring velocity and position requires acceleration to be temporally integrated once for velocity, and then again for position. Thus, velocity and position are prone to accuracy and stability problems such as "integration of error."

Thus, what is needed in the art is a motion sensing arrangement that overcomes these effects.

SUMMARY OF THE INVENTION

Embodiments achieve technical advantages as a display device. In a preferred embodiment, the display device includes a diffuser screen movably suspended in the display device, and a voice coil mechanically coupled to the diffuser screen such that an electric current in the voice coil imparts a force on the diffuser screen. The display device further includes a signal-processing device coupled to the voice coil, the signal-processing device producing the electric current in response to a voltage sensed across the voice coil by the signal-processing device. In an advantageous embodiment, the signal-processing device is a digital signal-processing device. In a further advantageous embodiment, the signal-processing device is a microprocessor, a microcontroller, or digital signal processor (DSP). A microcontroller is generally considered to be a microprocessor that includes one or more peripheral circuits such as an analog-to-digital converter, a digital-to-analog converter, a pulse-width modulator, and an RS-232 serial interface. As used herein, the term microprocessor is intended, without limitation, to optionally include functions that may be included in a microcontroller. The term microprocessor is also intended to include herein, without limitation, a DSP, which is a specialized microprocessor designed specifically for real-time digital signal processing. In a further advantageous embodiment, the display device includes a driver circuit coupled between the signal-processing device and the voice coil to produce the electric current for the voice coil at an output terminal of the driver circuit. In an advantageous embodiment, the driver circuit is a class D audio amplifier with output signal shutdown control that drives the output terminal of the signal-processing device to a high-impedance state during a shutdown period to accommodate sensing the voltage across the voice coil during the shutdown period. In this manner, the signal for the voice coil can be advantageously produced by the signal-processing device in a closed-loop feedback arrangement. In an advantageous embodiment, a damping ratio and a resonant frequency of the closed-loop feedback arrangement are 0.3 and 7 Hz, respectively. In an advantageous embodiment, a second voice coil is coupled to the diffuser screen and to the signal-processing device to produce a second closed-loop signal for a second voice coil so that a circular motion can be controllably produced for the diffuser screen.

Another advantageous embodiment provides a device including a movably suspended mechanical element to which it is desired to impart a controlled motion. In an advantageous embodiment, a voice coil is mechanically coupled to the mechanical element, and a voltage-sensing circuit is coupled to the voice coil to sense a voltage produced across the voice coil by a motion of the mechanical element. A driver circuit is coupled to the voltage-sensing circuit so that the driver circuit produces a drive signal at an output terminal thereof for driving the voice coil in response to the sensed voltage. In an advantageous embodiment, the voltage-sensing circuit and the driver circuit producing the drive signal for the voice coil operate alternately to accommodate the voltage-sensing circuit sensing the voltage produced across the voice coil. In a further advantageous embodiment, the driver circuit is a class D audio amplifier with output signal shutdown control that drives the output terminal of the driver circuit to a high-impedance state during a shutdown period to accommodate sensing the voltage produced across the voice coil during the shutdown period. In a further advantageous embodiment, the voltage-sensing circuit is coupled to an analog-to-digital converter.

A further advantageous embodiment provides a method of imparting a motion to a diffuser screen. In an advantageous embodiment, the method includes sensing a motion of the diffuser screen with a conductive coil positioned in a magnetic field, and sensing a voltage produced across terminals of the conductive coil by the motion of the diffuser screen. The method further includes producing a current in the conductive coil in response to the voltage produced across the terminals of the conductive coil to impart a force on the diffuser screen. In an advantageous embodiment, the method includes intermittently operating a circuit that produces the current in the conductive coil in a high-impedance state to accommodate sensing the voltage produced across terminals of the conductive coil, and in a low-impedance state to accommodate producing the current in the conductive coil. In an advantageous embodiment, the method further includes clamping a maximum voltage produced across the conductive coil when the circuit producing the current in the conductive coil is operated in the high-impedance state. In an advantageous embodiment, the method includes comparing the voltage produced across terminals of the conductive coil with a signal representing voice-coil programmed velocity to produce the current in the conductive coil. In an advantageous embodiment, the method further includes comparing with a digital circuit the voltage produced across terminals of the conductive coil with the signal representing voice-coil programmed velocity.

In a further advantageous embodiment, the method includes sensing a motion of the diffuser screen with a second conductive coil positioned in a second magnetic field, and sensing a second voltage produced across terminals of the second conductive coil by the motion of the diffuser screen. The method further includes producing a second current in the second conductive coil in response to the voltage produced across the terminals of the conductive coil to impart a second force on the diffuser screen. In an advantageous embodiment, the method includes producing a continuous motion for the diffuser screen.

BRIEF DESCRIPTION OF THE DRAWINGS

For a more complete understanding of the embodiments, and the advantages thereof, reference is now made to the following descriptions taken in conjunction with the accompanying drawings, in which:

FIG. 7 illustrates waveforms produced employing another strategy for sensing a voice-coil voltage;

FIG. 9 illustrates a block signal-flow diagram of one channel of a feedback loop to control diffuser screen motion.

DETAILED DESCRIPTION OF ILLUSTRATIVE EMBODIMENTS

The making and using of the presently preferred embodiments are discussed in detail below. It should be appreciated, however, that the embodiments provide many applicable inventive concepts that can be embodied in a wide variety of specific contexts. The specific embodiments discussed are merely illustrative of specific ways to make and use the invention, and do not limit the scope of the invention.

Embodiments will be described with respect to preferred embodiments in a specific context, namely an apparatus and method using a voice coil that can impart a force to, and sense the motion of, a physical device such as a diffuser screen employed in a display device. However, the use of this specific context is for illustrative purposes and does not limit the scope of the invention or the appended claims.

Applications of screen motion detectors serve large display-oriented markets with intense, competitive pressures. Thus, a screen motion-producing and motion-sensing arrangement that can be produced with existing technology, and that does not require the addition of separate motion-sensing components would provide a competitive advantage.

Figure 1:
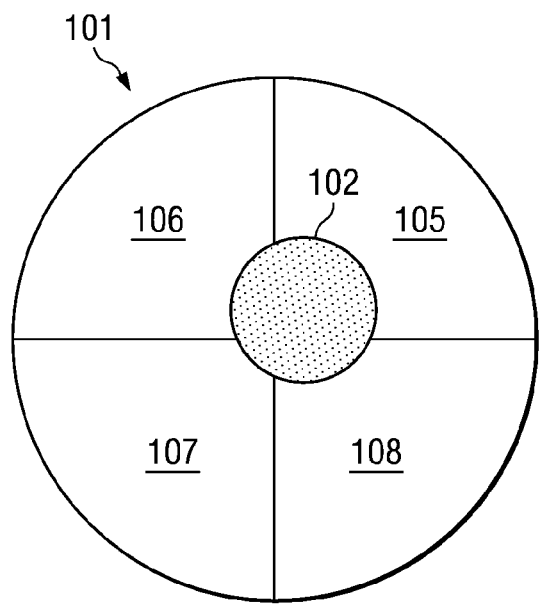
FIG. 1 illustrates a simplified drawing of a four-quadrant optical position sensor of the prior art.
Figure 2:
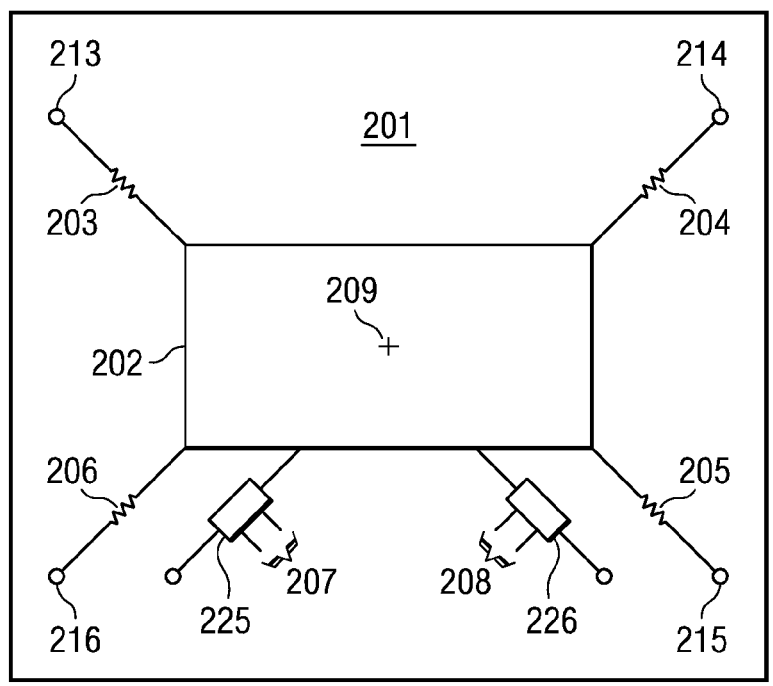
FIG. 2 illustrates a housing of a display device including a diffuser screen and force-imparting and velocity-sensing voice coils.

Turning now to FIG. 2, illustrated is a housing 201 of a display device, constructed according to the principles of an embodiment, such as the cabinet of a DLP® television receiver, including a diffuser screen 202, to which it is desired to impart a controlled, continuous motion. The diffuser screen 202 is movably suspended by springs 203, 204, 205, and 206, which are preferably attached to the periphery of the diffuser screen at attachment points 213, 214, 215, and 216, respectively. Springs 203, 204, 205, and 206 may include dashpot devices (not shown) to damp motion of diffuser screen 202. Voice coils 225 and 226 are coupled to diffuser screen 202 to impart forces thereon to produce motion of the diffuser screen. As illustrated in FIG. 2, the voice coils are coupled to an edge of the diffuser screen with their axes advantageously aligned substantially with the center of gravity 209 of the diffuser screen assembly. However, in an alternative embodiment, the voice coils may be coupled to other locations of the diffuser screen, or aligned differently, to impart forces thereto. Current may be supplied to each voice coil respectively through wire pairs 207 and 208.

The voice coils are constructed with an electrically conductive coil movably positioned in a magnetic field. Such coil-magnetic field arrangements are typically employed in the construction of loudspeakers and other sound-producing devices, wherein an electrical current produced in a coil interacts with a magnetic field to produce a net resulting force on the coil, in turn resulting in motion of the coil. The motion of the coil in a loudspeaker or other sound-producing device is typically mechanically coupled to a movable diaphragm to produce an audible sound wave. However, in the present arrangement, a voice coil imparts a force to a diffuser screen by means of a coil-magnetic field arrangement without the production of an objectionable sound. In a preferred embodiment, the magnetic field is produced by a permanent magnet.

Voice coils 225 and 226 illustrated in FIG. 2 are shown mounted roughly perpendicularly to each other to produce motion of the diffuser screen along two independent mechanical axes. In an advantageous arrangement, the net motion of the diffuser screen is substantially circular with a diameter of motion that is roughly 2 mm, at a frequency of about 5 to 10 Hz. In a further advantageous embodiment, the diffuser screen is moved in a circular pattern without a superimposed rotational mode. Such rotational modes can result in a stationary or low-velocity point on the diffuser screen with reduced despeckling effect. The use of the term circular herein with reference to motion includes an elliptical motion, wherein the axes of an ellipse describing such motion are not equal.

To produce a circular motion for a diffuser screen, one voice coil is driven with a signal of the form $A1 \cdot \cos(2\pi f t)$, where f is frequency such as 7 Hz, and the second voice coil with a "quadrature" signal, i.e., a signal 90° out of phase, of the form $A2 \cdot \sin(2\pi f t)$. Typically the signal amplitudes A1 and A2 are equal, i.e., A1=A2. Other variations of diffuser screen motion such as a "figure-eight" trajectory are also desirable, which can advantageously produce relatively constant translational diffuser screen velocity. A figure-eight trajectory can be produced by driving one voice coil with a signal of the form $A1 \cdot \cos(2\pi f t)$, and the other with a signal of the form $A2 \cdot \cos(4\pi f t)$.

The voice coils in the embodiments provide a dual function. In addition to imparting a force on a diffuser screen, the motion of the voice coil in its magnetic field is employed to sense voice-coil motion, and thereby diffuser screen motion. The motion of a conductor in a magnetic field, as described by Faraday's law, produces a voltage across the terminals of the conductor proportional to velocity of the conductor. Thus, the voice coils can be used in such a dual role to sense diffuser screen velocity by sensing a corresponding proportional voltage produced across the voice-coil terminals. The diffuser-screen motion sensed by the voice coils is used in a feedback arrangement to control the voice-coil current to produce circular motion of the diffuser screen with minimal superimposed rotational motion, and with minimally excited unintended mechanical resonance.

Figure 3:
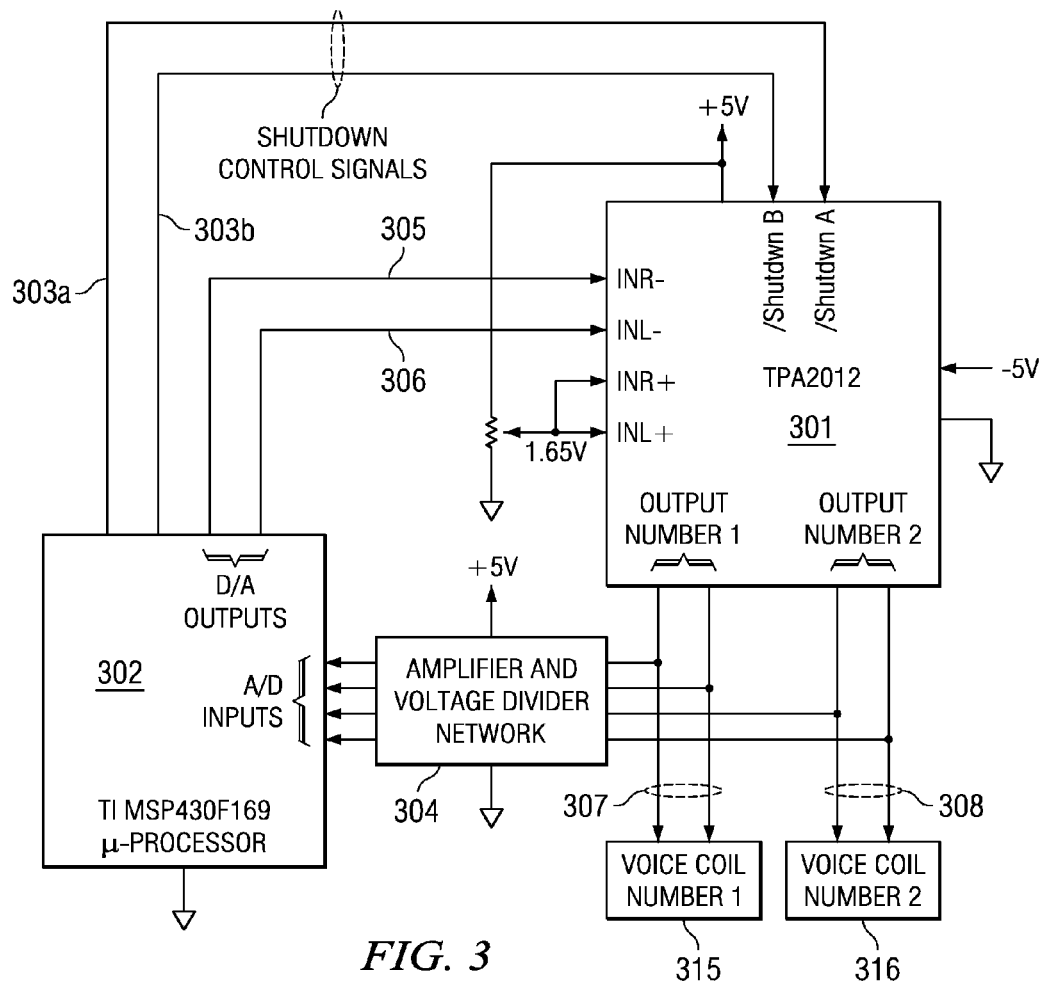
FIG. 3 illustrates a simplified block diagram of a circuit arrangement to generate force-producing currents in two voice coils, including feedback to control voice-coil currents.

Turning now to FIG. 3, illustrated is a simplified block diagram of a circuit arrangement, constructed according to the principles of an embodiment, to generate force-producing currents, respectively, in two voice coils, and a feedback process to control the voice-coil currents to produce a desired diffuser screen motion. A driver circuit 301 produces output voltages/currents, such as output current in leads 307 and 308, to drive voice coils 315 and 316 in response to input signals on leads 305 and 306. Voltages produced across voice coils 315 and 316 during voice-coil sensing periods are sensed by a voltage-sensing circuit 304, preferably including an amplifier and voltage-divider network, coupled to digital signal-processing device 302. Of course, in an alternative advantageous embodiment, the signal-processing device 302 can be an analog or mixed-signal signal-processing device. In response to sensed voltages across voice coils 315 and 316, digital signal processing device 302 produces input signals on leads 305 and 306 that driver 301 employs to control its output currents coupled to the voice coils. In this manner, the output currents coupled to the voice coils are produced in a feedback arrangement so that motion of the diffuser screen is controllably produced.

In a preferred embodiment, a Texas Instruments TPA2012 is employed to construct driver 301. Of course, other drivers can be used within the broad scope of embodiments. A TPA2012, as described in Texas Instruments datasheet dated March 2007, which is hereby referenced and incorporated herein, is a two-channel, "filter-free," class D audio amplifier with independent and rapid shutdown control for each channel. Class D filter-free operation implies producing an output voltage with sufficiently high-frequency switching of an internal power switch that minimal or no low-pass filtering of the output voltage is required in a practical application. A differential input voltage signal, such as a differential input voltage signal on leads 305 and 306, produces an amplified output voltage, such as output voltage on leads 307 and 308. The output voltage produces a current in a respectively coupled voice coil. A TPA2012 driver, in response to a shutdown signal on an input lead, such as shutdown control signals 303a and 303b, causes the TPA2012 driver output nodes to assume a high-impedance state, such as 2 kΩ output impedance. The result of such high impedance causes voice-coil current to terminate rapidly so that the respective voltage produced by voice-coil motion can be sensed by the digital signal-processing device during the shutdown time interval.

In an advantageous embodiment, digital signal-processing device 302 is constructed with 16-bit Texas Instruments microprocessor MSP430F169. This microprocessor, as described in Texas Instruments datasheet dated September 2007, which is hereby referenced and incorporated herein, provides on-chip analog-to-digital conversion as well as digital-to-analog conversion. Other digital signal-processing devices can be used within the broad scope of embodiments, including arrangements incorporating separate devices for analog-to-digital conversion and digital-to-analog conversion.

The TPA2012 driver produces output voltages that can span a voltage range of +5 V to −5 V. The operating voltage range for inputs and outputs of an MSP430F169 microprocessor is 0 V to 3.3 V. Accordingly, a voltage scaling and translation circuit is advantageously employed for signals exchanged between the TPA2012 driver and the MSP430F169 microprocessor if the full bipolar voltage range of the TPA2012 driver is used. This scaling and translation function for each of the four signals coupled between the TPA2012 driver and the MSP430F169 microprocessor is advantageously performed by amplifier and voltage divider network 304.

Figure 4:
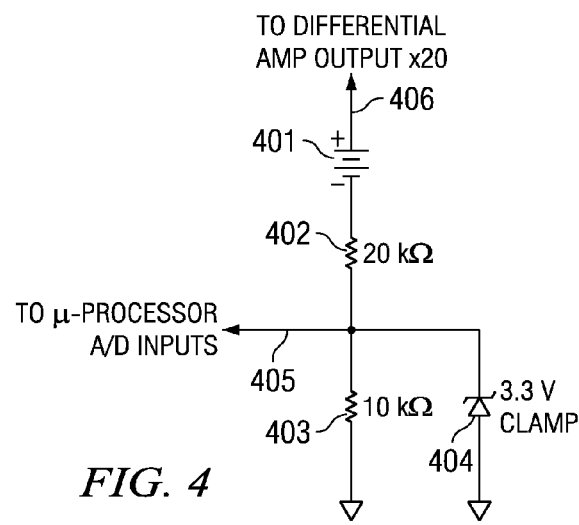
FIG. 4 illustrates a simplified schematic drawing of a voltage scaling and translation circuit to convert a bipolar voltage into a unipolar voltage with a reduced scale factor.

Turning now to FIG. 4, illustrated is a simplified schematic drawing of a voltage scaling and translation circuit, constructed according to the principles of an embodiment, that converts a bipolar voltage into a unipolar voltage with a reduced voltage scale factor. The input signal to this circuit, i.e., the signal on lead 406, is an output signal from driver 301, such as a signal on leads 307 or 308 as illustrated and described hereinabove with reference to FIG. 3. An instance of this circuit is coupled to each output lead of driver 301. Thus, four instances of this circuit are included in amplifier and voltage-divider network 304 illustrated in FIG. 3. The input signal is offset by a voltage source 401, and is then attenuated by resistor network comprising resistors 402 and 403. Representative values of resistors to produce a 3:1 attenuation of the input signal are illustrated in FIG. 4. Although voltage source 401 is illustrated in FIG. 4 with a battery, practical circuit implementations including a Zener diode or a three-terminal regulator coupled to a voltage source are circuit design techniques well-known in the art, and in the interest of brevity will not be further described. A Zener diode 404 clamps voltage spikes at output node 405, which is an analog input signal to the MSP430F169 microprocessor. Thus, the input signal on lead 406, which spans a bipolar voltage range, is translated and scaled to produce a unipolar signal within the operating range of the microprocessor.

Figure 5:
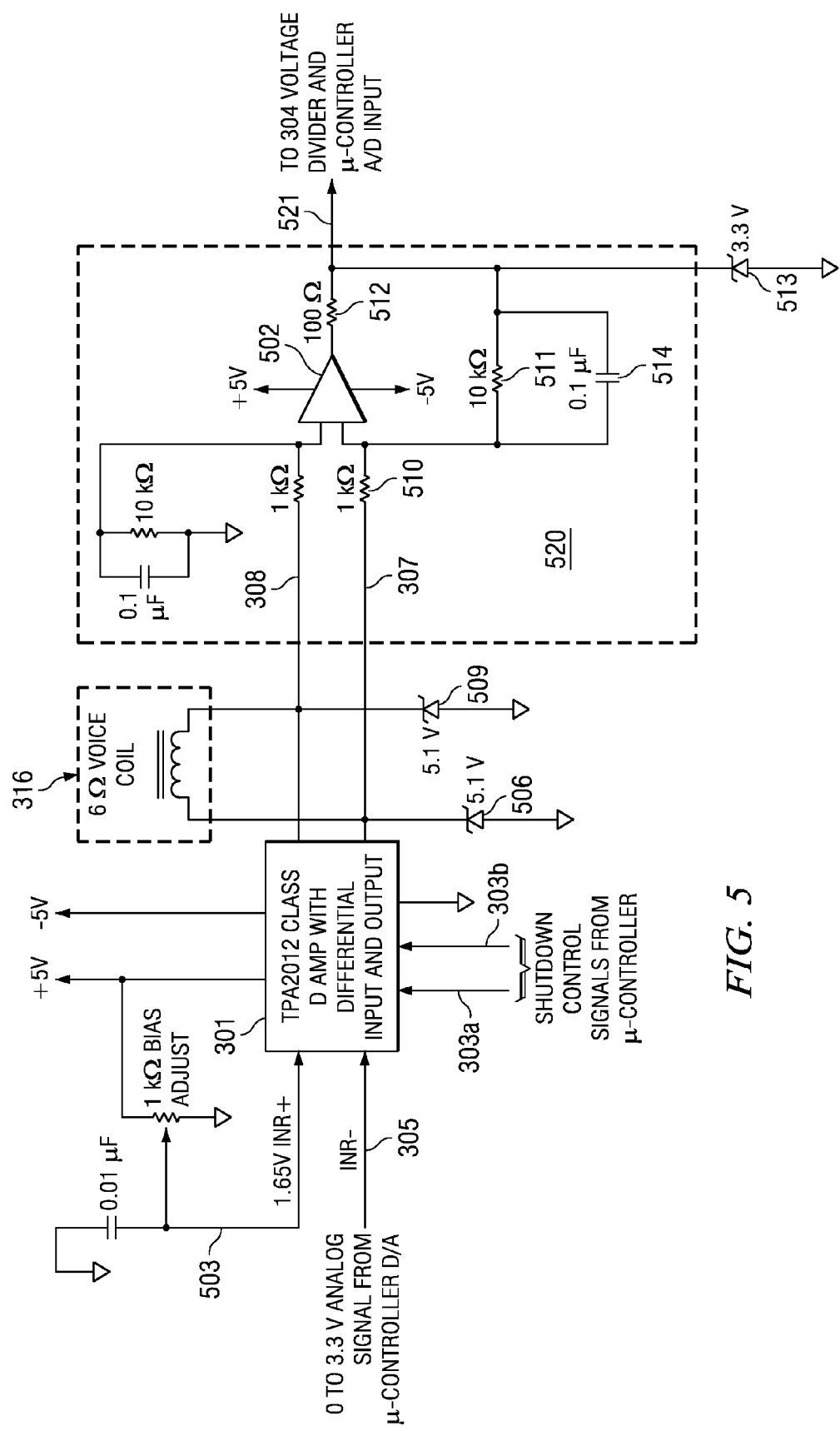
FIG. 5 illustrates a simplified schematic drawing of a feedback circuit arrangement illustrating a signal path from an output of a microprocessor to an input of an amplifier and voltage-divider network.

Turning now to FIG. 5, illustrated is a simplified schematic drawing of a feedback circuit arrangement, constructed according to the principles of an embodiment, illustrating the signal path from the output of the MSP430F169 microprocessor to the input to the amplifier and voltage-divider network 304. The output signal from the MSP430F169 microprocessor, illustrated in FIG. 5 on lead 305, is produced by a digital-to-analog converter therein, and is coupled to an input of TPA2012 driver 301. An input signal to TPA2012 driver 301 is also illustrated in FIG. 3 on lead 305. Output signals from driver 301 are coupled to voice coils. In FIG. 5, only one voice coil is illustrated, i.e., voice coil 316, which is identified in FIG. 5 as a 6Ω voice coil. Of course, a voice coil with a different impedance can be used within the broad scope of embodiments. A second voice coil is controlled by a similar circuit branch (not shown). Voltage spikes on output signals from driver 301 are clamped by Zener diodes 506 and 509. Output signals from driver 301 are also coupled to differential amplifier 520. Differential amplifier 520 preferably provides a low-frequency voltage amplification gain of 10:1, which is set by gain-setting resistors, such as resistors 510 and 511. High-frequency gain of differential amplifier 520 is attenuated by capacitors, such as by capacitor 514. Resistor 512 in series with operational amplifier 502 accommodates clamping of output voltage 521 by Zener diode 513. The other half of differential input signal 305 to TPA2012 driver 301 is a constant bias voltage supplied on lead 503, produced by a voltage divider coupled to a bias voltage source.

To sense a voltage produced across a voice coil due to motion of a diffuser screen, it is advantageous to disable temporarily the drive voltage produced by driver 301, and allow the outputs of driver 301 to assume a high-impedance state. It may even be advantageous in a practical circuit implementation to disable the drive voltage to the voice coils for a sufficiently long period of time to allow voice-coil current to substantially decay so that the small voice-coil voltage produced by diffuser screen motion can be accurately sensed. The voice-coil current that flows when voice-coil drive voltage is disabled is produced by back-electromotive force induced by parasitic inductance of the voice coil. Disabling of output voltages by driver 301 is accomplished on shutdown leads 303a and 303b, illustrated in FIGS. 3 and 5. Leads 303a and 303b are also identified and illustrated in FIGS. 3 and 5 as signals "/Shutdwn A" and "/Shutdwn B," the leading slash emphasizes that shutdown is signaled when these signals are logic low. Leads 303a and 303b are controlled by the MSP430F169 microprocessor.

Figure 6:
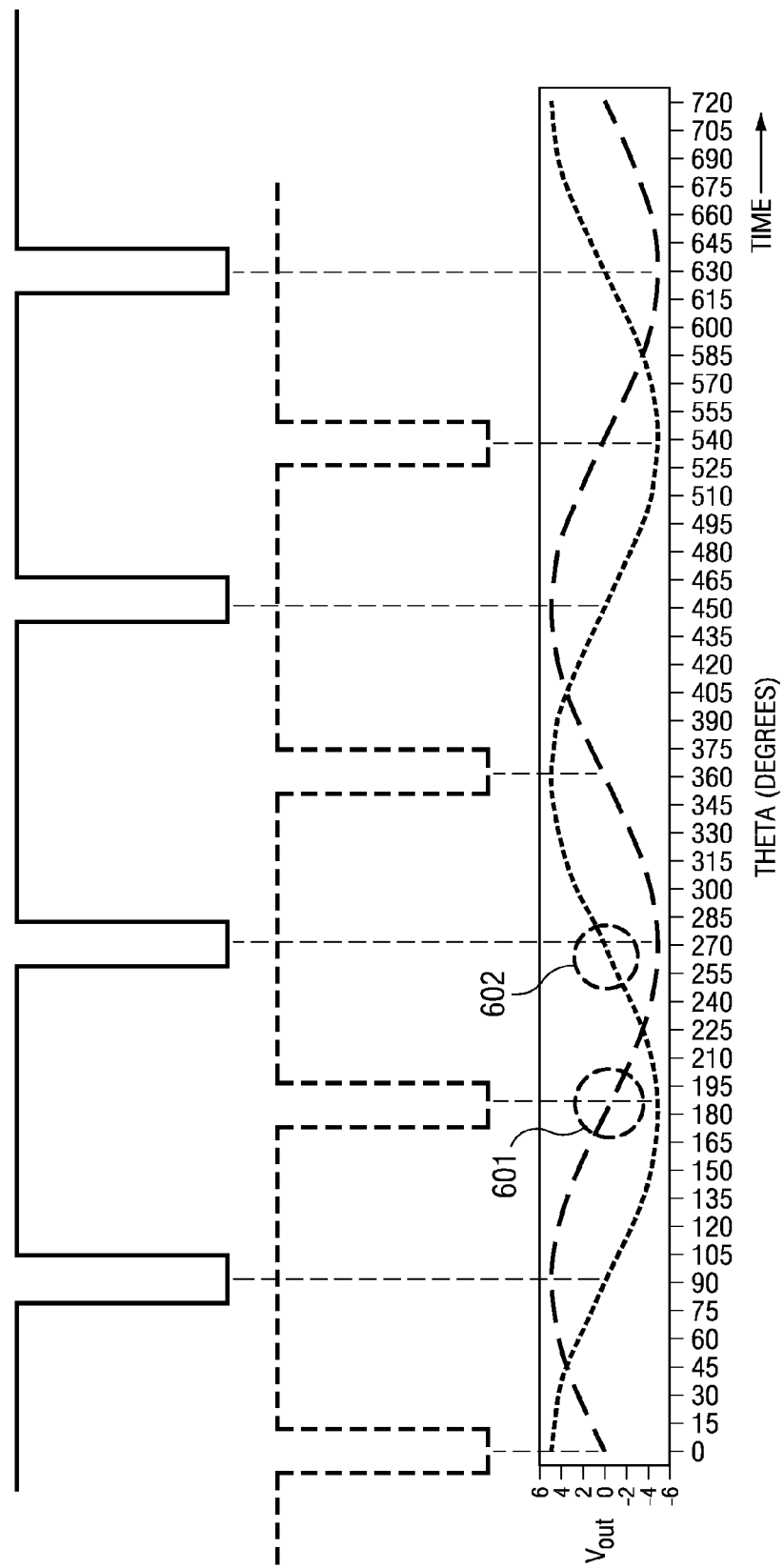
FIG. 6 illustrates waveforms produced employing a strategy for sensing a voice-coil voltage.

Turning now to FIG. 6, typical waveforms over time for signal/Shutdwn A, signal/Shutdwn B, and output voltages from driver 301 coupled to voice coils are shown, illustrating one strategy for sensing voice-coil voltage during driver shutdown periods. Also illustrated in FIG. 6 are typical phase-quadrature differential drive signals, identified in FIG. 6 as "Channel A" and "Channel B," which are generated by driver 301 in response to input signals from the MSP430F169 microprocessor to produce circular motion for the diffuser screen. Voice coil velocities in this strategy are preferably briefly sampled near zero crossings 601, 602, of the differential drive signals, when insubstantial power is coupled to the voice coils. At zero crossings of the differential drive signals, i.e., output voltages, from driver 301, the shutdown signals are asserted, i.e., these negative-logic signals are set low to disable the respective output voltage of the driver 301 to enable voltages produced by the voice coils in response to diffuser screen motion to be sensed. During a remaining period of time when an output voltage from driver 301 is not near a zero crossing, the driver 301 actively drives the respective voice coil with a differential drive signal. The MSP430F169 microprocessor produces control signals for driver 301 in response to sensed diffuser screen motion. Thereby a closed-loop feedback arrangement is implemented to controllably produce circular motion of the diffuser screen, preferably without a superimposed rotational component of the diffuser screen, and without the need for separate diffuser screen motion sensors.

Turning now to FIG. 7, illustrated are typical waveforms over time for signals /Shutdwn A and /Shutdwn B, and output voltages from driver 301 coupled to voice coils, illustrating another strategy for sensing voice-coil voltage during a shutdown interval. Also illustrated in FIG. 7 are typical phase-quadrature differential drive signals, identified in FIG. 6 as "Channel A" and "Channel B," which are generated by driver 301 in response to input signals from the MSP430F169 microprocessor. In this strategy, voice coil velocities are preferably sampled, without limitation, over an entire half waveform of the voice-coil drive voltage (or current), relying on inertia of the diffuser screen and the restoring forces of the supporting springs to maintain circular diffuser screen motion. Other strategies to disable output waveforms from the driver to enable sampling the voltage produced by voice coils in response to diffuser screen motion include alternately sampling and actively driving terminals of a voice coil a plurality of times during a period of motion of the voice coil, sampling voice-coil voltage over an interval longer than a period of its motion, and other sampling and driving strategies that can be readily constructed within the broad scope of embodiments.

As described hereinabove, motion of a diffuser screen is sensed employing Faraday's law to produce a voltage across terminals of a voice coil that is proportional to diffuser screen velocity. The control process implemented in the MSP430F169 microprocessor may integrate the sensed voltage to produce an estimate of diffuser screen position. Thus, signals can be produced within the microprocessor to represent both diffuser screen position and velocity.

Figure 8:
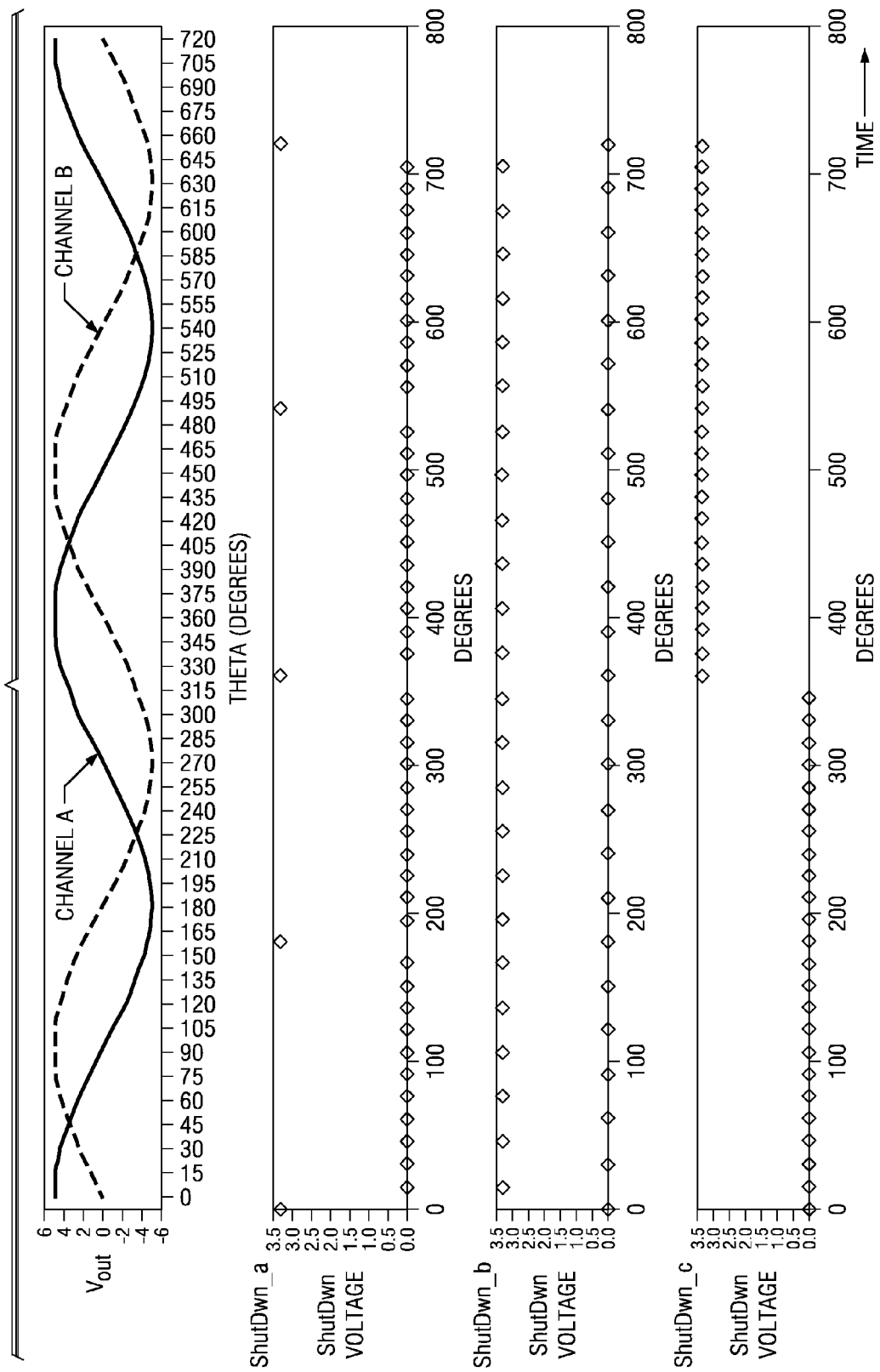
FIG. 8 illustrates further waveforms representing strategies for sensing voice-coil voltage during a shutdown interval.

Turning now to FIG. 8, illustrated are further representations of strategies for sensing voice-coil voltage during a shutdown interval. Typical waveforms over time for phase-quadrature differential drive signals "Channel A" and "Channel B," generated by driver 301, are illustrated in the top graph, "Output Diff. Voltage." Shutdown signals, previously described as /Shutdwn A and /Shutdwn B, are illustrated with the opposite logical sense in FIG. 8 in the three graphs labeled "ShutDwn_a," "ShutDwn_b," and "ShutDwn_c," i.e., a logic high signal now signals shutdown. In one advantageous embodiment, as illustrated in the second graph labeled "ShutDwn_a," voice coils are driven with an approximately sinusoidal duty-cycle waveform, and velocity is briefly sampled twice during each drive cycle. In a second advantageous embodiment, as illustrated in the third graph labeled "ShutDwn_b," sampling is rapidly cycled between drive and sense modes to provide many velocity samples during each drive cycle. In a third advantageous embodiment, as illustrated in the fourth graph labeled "ShutDwn_c," samples are continuously taken over a full drive cycle.

Turning now to FIG. 9, illustrated is a block diagram illustrating one channel of a feedback loop to control diffuser screen motion. A similar block diagram (not shown) represents a second feedback channel. The block diagram is shown with Laplace transform variable "s" representing an independent variable in the complex frequency plane. Input signal 901, produced in the MSP430F169 microprocessor, is advantageously a sinusoidal waveform with a frequency of 7 Hz, representing the desired sinusoidal motion of the diffuser screen. The input signal to a second feedback channel is also a sinusoidal waveform at the same frequency, but shifted in phase by 90°, i.e., a cosinusoidal waveform. In an alternative embodiment, the input signal to the second feedback channel is a sinusoidal waveform at twice the frequency of the first waveform. These input signals can be produced with the use of a sinusoid lookup table in microprocessor memory, with D/A converters, to generate sinusoidal and cosinusoidal waveforms. The input signal 901 is coupled to summer 906 which subtracts voice-coil output voltage from the input signal to produce a signal representing diffuser screen velocity error. The error signal is processed in block 902 with transform function G(s) to produce a signal to control output voltage of the voice coil. This signal produced by block 902 corresponds to the voltage difference between signals 307 and 308 that are illustrated and described hereinabove with reference to FIGS. 3 and 5. Block 903, containing transform function D/s, represents the integration of force produced by a voice coil on a diffuser screen to produce diffuser-screen motion. The constant D in block 903 can be readily measured for a particular voice-coil/diffuser screen physical arrangement, using procedures well known in the art. Block 904, containing constant gain $K_{vc}$, represents the substantially linear proportionality of diffuser-screen velocity to voice-coil output voltage, which can be readily determined for a particular voice coil.

In an advantageous embodiment, the feedback arrangement illustrated in FIG. 9 is designed for implementation in a microprocessor-controlled system to produce a second-order closed-loop response. In an advantageous embodiment, the second-order response is designed with a damping ratio of approximately 0.3 and a resonant frequency of 7 Hz by selection of frequency-dependent gain G(s). For example, and without limitation, the form of the frequency-dependent function G(s) may be the one-pole function $$L \cdot \frac{\tau \cdot s + 1}{A \cdot s + 1}$$

where τ, L, and A are constants selected using ordinary design techniques to provide a desired damping ratio and resonant frequency for the feedback process. This one-pole function is operative in conjunction with the inherent inertia of a diffuser screen to produce a second-order closed-loop response. The incorporation of a frequency-dependent gain G(s) in a microprocessor-controlled feedback arrangement to produce a second-order response of the diffuser screen to a voice-coil input current with a damping ratio and a resonant frequency is a technique well-known to one with ordinary skill in the art of control systems, and will not be further described in the interest of brevity.

Of course, implementation of such a feedback arrangement in a microprocessor-controlled system can be mathematically represented by equivalent well-known, discrete-time analytic techniques within the broad scope of embodiments.

The selection of frequency-dependent gain G(s) permits control of diffuser screen motion, including adjustable linear damping. In techniques used in the prior art, dashpots or other motion-damping devices, with their inherent nonlinearities, were often employed to provide damping of inherent system resonances. Higher order terms can be readily incorporated into the gain G(s) using control techniques well known in the art to control system resonances without the need for additional mechanical elements, and their associated cost. A gain that may be frequency dependent may also be included in the feedback path from voice-coil output voltage 905 to the inverting input of summer 906 to impart further damping or resonant frequency characteristics to the feedback arrangement.

Thus, a system to impart motion to a diffuser screen or other physical element in a feedback arrangement without the need for separate position sensing elements has been introduced. The system advantageously accommodates a controlled level of mechanical damping without the need for separate mechanical damping components.

Although embodiments and their advantages have been described in detail, it should be understood that various changes, substitutions and alterations can be made herein without departing from the spirit and scope of the invention as defined by the appended claims. For example, it will be readily understood by those skilled in the art that the circuits, circuit elements, and utilization of techniques to form the processes and systems providing efficient implementation of a system to impart motion to a diffuser screen with motion feedback and controlled damping as described herein may be varied while remaining within the broad scope of embodiments. Further, these techniques can be applied to other systems requiring imparting feedback-controlled motion to a mechanical element that is not a diffuser screen.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A display device comprising:
    a diffuser screen movably suspended within a housing of said display device;
    a driver circuit;
    a voice coil mechanically coupled to said diffuser screen such that an electric current applied to said voice coil by said driver circuit imparts a force on said diffuser screen for driving said diffuser screen in a controlled motion relative to said housing in a drive mode of operation; and
    a voltage-sensing circuit coupled to said voice coil such that a voltage due to an electric current induced in said voice coil by said motion of said diffuser screen is sensed for feedback to said driver circuit in a sense mode of operation.

2. The display device according to claim 1, further comprising a signal-processing device coupled between said drive circuit and said voice coil to regulate said electric current applied by said driver circuit in response to said sensed voltage.

3. The display device according to claim 2, wherein said driver circuit is a class D audio amplifier with output signal shutdown control that drives an output terminal of said driver circuit to a high-impedance state for switching between said drive mode and said sense mode during a shutdown period.

4. The display device according to claim 2, wherein said applied electric current is set by said signal-processing device in a closed-loop feedback arrangement.

5. The display device according to claim 1, wherein an axis of the said voice coil is aligned with a center of gravity of said diffuser screen.

6. The display device according to claim 1, wherein said signal-processing device is a microprocessor.

7. The display device according to claim 1, further comprising:
a second voice coil mechanically coupled to said diffuser screen and to said signal-processing device, wherein said signal-processing device is configured to regulate a second electric current applied to said second voice coil in response to a second voltage due to a second electric current induced in said second voice coil.

8. The display device according to claim 7, wherein said signal-processing device is configured to regulate said electric currents applied to said voice coils to produce circular motion for said diffuser screen.

9. The device according to claim 1, wherein said voltage-sensing circuit and said driver circuit are configured to alternately apply said electric current in said drive mode and sense said voltage in said sense mode.

10. The device according to claim 1, wherein said voltage-sensing circuit is coupled to an analog-to-digital converter.

11. A display device comprising:
a diffuser screen movably suspended within said display device;
a voice coil mechanically coupled to said diffuser screen such that an electric current in said voice coil imparts a force on said diffuser screen; and
a signal-processing device coupled to said voice coil, said signal-processing device producing said electric current in response to a voltage sensed across said voice coil by said signal-processing device;
wherein said electric current is produced by said signal-processing device in a closed-loop feedback arrangement, and wherein a damping ratio and a resonant frequency of said closed-loop feedback arrangement are about 0.3 and about 7 Hz, respectively.

12. A method of imparting a motion to a diffuser screen movably suspended within a housing of a display device, the method comprising:
applying an electric current to a voice coil to impart a force on said diffuser screen for driving said diffuser screen in a controlled motion relative to said housing in a drive mode of operation;
sensing a voltage due to an electric current induced in said voice coil by said motion of said diffuser screen in a sense mode of operation; and
regulating said electric current applied to said voice coil in response to said sensed voltage.

13. The method according to claim 12, further including providing a driver circuit for applying said electric current; operating said driver circuit in a high-impedance state to accommodate sensing said voltage in said sensing mode, and operating said driver circuit in a low-impedance state to produce said applied electric current.

14. The method according to claim 13, further including clamping a maximum voltage produced across said voice coil when said driving circuit is operated in said high-impedance state.

15. The method according to claim 12, further including comparing said sensed voltage with a signal representing voice-coil programmed velocity to set said electric current applied to said voice coil.

16. The method according to claim 12, further comprising:
applying a second electric current to a second voice coil to impart a second force on said diffuser screen for driving said diffuser screen in said drive mode;
sensing a second voltage due to a second electric current induce in said second voice coil by motion of said diffuser screen in said sense mode; and
regulating said second electric current applied to said second voice coil in response to said second sensed voltage.

17. The method according to claim 16, wherein said electric currents applied to said first and second voice coils produce a continuous motion of said diffuser screen.

* * * * *